(12) United States Patent
Tang

(10) Patent No.: US 11,553,505 B2
(45) Date of Patent: Jan. 10, 2023

(54) METHOD AND APPARATUS FOR DETERMINING TRANSMISSION DIRECTION AND TRANSMISSION CHANNEL AND COMPUTER STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/381,841

(22) Filed: Jul. 21, 2021

(65) Prior Publication Data
US 2021/0352680 A1    Nov. 11, 2021

Related U.S. Application Data

(63) Continuation of application No. 16/912,541, filed on Jun. 25, 2020, now Pat. No. 11,160,096, which is a
(Continued)

(30) Foreign Application Priority Data
Dec. 26, 2017    (WO) ................ PCT/CN2017/118450

(51) Int. Cl.
*H04W 4/00*    (2018.01)
*H04W 72/04*    (2009.01)
(Continued)

(52) U.S. Cl.
CPC ... *H04W 72/1205* (2013.01); *H04W 72/0446* (2013.01); *H04W 72/1268* (2013.01); *H04W 72/1273* (2013.01); *H04W 88/02* (2013.01)

(58) Field of Classification Search
CPC ......... H04W 72/1208; H04W 72/0446; H04W 72/1268; H04W 72/1273; H04L 5/0053
See application file for complete search history.

(56) References Cited

U.S. PATENT DOCUMENTS

| 9,698,966 | B2 | 7/2017 | Ji et al. |
| 2013/0324145 | A1 | 12/2013 | Tabet et al. |

(Continued)

FOREIGN PATENT DOCUMENTS

| CN | 102238531 A | 11/2011 |
| CN | 102668492 A | 9/2012 |

(Continued)

OTHER PUBLICATIONS

CNIPA, Second Office Action for Chinese Application No. 202010406527.X, dated Sep. 27, 2021. 11 pages with English translation.
(Continued)

*Primary Examiner* — Diane L Lo
*Assistant Examiner* — Abusayeed M Haque
(74) *Attorney, Agent, or Firm* — Perkins Coie LLP

(57) ABSTRACT

This application discloses a method for determining transmission direction performed at a terminal and an associated computer-readable storage medium. The method includes: obtaining, by the terminal, first configuration signaling, wherein the first configuration signaling indicates that one or more symbols in a slot are used to transmit data in a first transmission direction; obtaining, by the terminal, second configuration signaling, wherein the second configuration signaling indicates that at least one of the one or more symbols in the slot is used to transmit data in a second transmission direction; determining, by the terminal, transmitting data on the one or more symbols in the first transmission direction, and not transmitting data on the at least (Continued)

one of the one or more symbols in the second transmission direction, wherein the first configuration signaling is cell-specific radio resource control (RRC) signaling.

20 Claims, 5 Drawing Sheets

Related U.S. Application Data continuation of application No. PCT/CN2018/097466, filed on Jul. 27, 2018.

(51) Int. Cl.
*H04L 5/00* (2006.01)
*H04W 72/12* (2009.01)
*H04W 88/02* (2009.01)

(56) References Cited

U.S. PATENT DOCUMENTS

| | | | |
|---|---|---|---|
| 2014/0269451 A1 | 9/2014 | Papasakellariou et al. | |
| 2014/0341091 A1 | 11/2014 | Ji et al. | |
| 2015/0078222 A1* | 3/2015 | Yang | H04W 72/1257 370/280 |
| 2015/0117294 A1* | 4/2015 | Li | H04W 72/042 370/312 |
| 2015/0237604 A1* | 8/2015 | Shi | H04L 27/2602 370/330 |
| 2016/0021655 A1 | 1/2016 | Seo et al. | |
| 2017/0273077 A1 | 9/2017 | Kim et al. | |
| 2017/0318607 A1* | 11/2017 | Tiirola | H04W 4/10 |
| 2018/0063865 A1* | 3/2018 | Islam | H04L 5/0091 |
| 2018/0367289 A1* | 12/2018 | Kim | H04L 5/0092 |
| 2020/0021421 A1* | 1/2020 | Han | H04L 5/14 |
| 2020/0067675 A1* | 2/2020 | Takeda | H04L 5/0007 |
| 2020/0229231 A1* | 7/2020 | Oh | H04W 72/0446 |
| 2020/0295878 A1* | 9/2020 | Choi | H04W 28/04 |
| 2020/0389271 A1* | 12/2020 | Matsumura | H04J 13/0074 |
| 2020/0389914 A1* | 12/2020 | Zhao | H04W 72/0446 |

FOREIGN PATENT DOCUMENTS

| | | |
|---|---|---|
| CN | 102869095 A | 1/2013 |
| CN | 105210312 A | 12/2015 |
| CN | 105682243 A | 6/2016 |
| CN | 102869095 B | 9/2017 |
| CN | 107223362 A | 9/2017 |
| CN | 107343317 A | 11/2017 |
| RU | 2583043 C1 | 5/2016 |
| TW | 201642701 A | 12/2016 |
| WO | 2013137794 A1 | 9/2013 |
| WO | 2019036634 A1 | 2/2019 |

OTHER PUBLICATIONS

EPO, Examination Report for European Application No. 18894694.1, dated Sep. 28, 2021. 5 pages.
IP Australia, Notice of Acceptance for Australian Patent Application No. 2018398735, dated Jul. 13, 2021. 3 pages.
Oppo, "Remaining Issues on GC-PDCCH", 3GPP TSG RAN WG1 Meeting AH 1801 R1-1800496, Jan. 22-26, 2018, 7 pages.
Qualcomm Inc: "Offline discussion on GC-PDCCH carrying SFI"; R1-1721702, 3GPP TSG RAN WG1 #91, Nov. 27-Dec. 1, 2017; 17 pages.
Decision on Rejection dated Dec. 29, 2021 of Chinese Patent Application No. 202010406527.X with English translation (10 pages).
First Examination Report dated Nov. 26, 2021 of India Patent Application No. 202017029169 (6 pages).
First Office Action dated Oct. 21, 2021 of Korean Patent Application No. 10-2020-7018876 with English translation (8 pages).
Notification to Grant Patent Right for Invention for Chinese Application No. 202010406527.X dated Jun. 6, 2022. 6 pages with English translation.
Patent Rejection Decision Document for Korean Application No. 10-2020-7018876 dated Jun. 17, 2022. 8 pages with English translation.
Shin, E-H. et al. "Average Sum-Rate Bound of Multiuser MIMO Beamforming with Direction-Indicating Matrices and Channel Magnitude Feedback" ICACT 2008; pp. 1729-1734.
3GPP TSG RAN WG1 Meeting #AH_NR2—Qingdao, P. R. China, Jun. 27-30, 2017—R1-1710968—CATT, [89-20] email discussion: Group-common PDCCH for NR (22 pages).
First Office Action dated Nov. 13, 2020 of Russian Patent Application No. 2020123152 (9 pages).
Full Examination Report dated Jan. 28, 2021 of Australian Patent Application No. 2018398735 (4 pages).
Guangdong OPPO Mobile Telecommunications Corp. Ltd., International Search Report and Written Opinion, PCT/CN2017/118450, dated Sep. 4, 2018, 5 pages.
Guangdong OPPO Mobile Telecommunications Corp. Ltd., International Search Report and Written Opinion, PCT/CN2018/097466, dated Sep. 26, 2018, 7 pgs.
Huawei, "Dynamic and semi-static DL/UL resource partition," 3GPP TSG RAN WG1 Meeting #90bis, RI-1717065, Prague, Czech Republic, Oct. 9-13, 2017, 7 pgs.
MediaTek Inc., Design of GC PDCCH, 3GPP TSG RAN WG1 Meeting 90bis, RI-1718324, Prague, CZ, Oct. 9-13, 2017, 4 pgs.
Nokia, Nokia Shanghai Bell, On the remaining aspects of group-common PDCCH in NR, 3GPP TSG-RAN WG1 RAN1#91, RI-1720508, 4 pgs.
Non-Final Office Action dated Feb. 11, 2021 of U.S. Appl. No. 16/912,541, filed Jun. 25, 2020.
Notice of Allowance dated Jun. 18, 2021 of U.S. Appl. No. 16/912,541, filed Jun. 25, 2020.
NTT Docomo, Inc., Remaining details on group-common PDCCH, 3GPP TSG RAN WG1 Meeting 91, RI-1720813, Reno, USA, Nov. 27-Dec. 1, 2017, 7 pgs.
OPPO, "Remaining issues on GC-PDCCH", 3GPP TSG RAN WG1 Meeting #91, RI-1719984, Nov. 27-Dec. 1, 2017, 8 D£S.
Qualcomm Incorporated, Remaining issues on slot format indication, 3GPP TSG RAN WG1 #91, RI-1720677, Reno, USA, Nov. 27-Dec. 1, 2017, 11 pgs.
Supplementary European Search Report dated Jan. 14, 2021 of European Patent Application No. 18894694.1 (11 pages).
Vivo, Remaining details on group-common PDCCH, 3GPP TSG RAN WG1 Meeting 91, R1-1719782, Reno, USA, Nov. 27-Dec. 1, 2017, 6 pages.
ZTE, Sanechips, Remaining details on group-common PDCCH, 3GPP TSG RAN WG1 Meeting #90bis, Prague, CZ, Oct. 9-13, 2017, RI-1717512, 6 pgs.
First Examination Report dated Jul. 9, 2021 of Canadian Patent Application No. 3,086,738 (3 pages).
First Office Action dated Jun. 2, 2021 of Chinese Patent Application No. 202010406527.X (15 pages).
First Office Action dated Jun. 21, 2021 of Japanese Patent Application No. 2020-535083 (6 pages).
Final Rejection of the Korean application No. 10-2020-7018876, dated Apr. 11, 2022. 10 pages with English Translation.
First Office Action of the Taiwanese application No. 107147212, dated Feb. 22, 2022. 26 pages with English Translation.
Summons to Attend Oral Proceedings of the European application No. 18894694.1, dated Mar. 22, 2022. 7 pages.
Apple Inc. "UE Behavior on UL/DL Transmission Direction Determination in NR TDD" R1-1710906; 3GPP TSG-RAN WG1 NR#2; Qingdao, China; Jun. 27-30, 2017. 4 pages.
Decision to Refuse a Patent Application for European Application No. 18894694.1 dated Nov. 18, 2022. 17 pages.
Request for the Submission of an Opinion for Korean Application No. 10-2022-7032266 issued Nov. 3, 2022. 8 pages with English translation.
Samsung "DL and UL Assignment for NR TDD" R1-1715986; 3GPP TSG RAN WG1 Meeting NR#3 Nagoya, Japan; Sep. 18-21, 2017. 4 pages.

(56) References Cited

OTHER PUBLICATIONS

Samsung "Indication of Reserved Resources" R1-1713655; 3GPP TSG RAN WG1 Meeting #90; Prague, Czechia; Aug. 21-25, 2017. 4 pages.

* cited by examiner

METHOD AND APPARATUS FOR DETERMINING TRANSMISSION DIRECTION AND TRANSMISSION CHANNEL AND COMPUTER STORAGE MEDIUM

CROSS-REFERENCE TO RELATED APPLICATION

This application is a continuation application of the U.S. application Ser. No. 16/912,541 filed on Jun. 25, 2020, which is a continuation application of PCT Patent Application No. PCT/CN2018/097466, entitled "METHOD AND APPARATUS FOR DETERMINING TRANSMISSION DIRECTION AND TRANSMISSION CHANNEL AND COMPUTER STORAGE MEDIUM" filed on Jul. 27, 2018, which claims priority to PCT Patent Application No. PCT/CN2017/118450, filed Dec. 26, 2017, the contents of which are hereby incorporated by reference in their entirety.

TECHNICAL FIELD

This application relates to the field of wireless communications technologies, and in particular, to a transmission direction determining method and apparatus, a transmission channel determining method and apparatus, and a computer storage medium.

RELATED ART

In a New Radio (NR) system, a slot or a symbol is used as a scheduling unit. Each slot includes 14 Orthogonal Frequency Division Multiplexing (OFDM) symbols. The NR system has a flexible frame structure. One slot may include a downlink (DL) symbol, an uplink (UL) symbol, and a flexible symbol. The flexible symbol is also referred to as an unknown symbol and may be rewritten by using signaling for DL transmission or UL transmission.

In the NR system, a base station may use various manners to explicitly or implicitly indicate a transmission direction in a symbol in a slot. However, different configuration signaling may indicate different transmission directions (or transmission channels). When a transmission direction (or transmission channel) configured by cell-specific radio resource control (RRC) signaling is different from a transmission direction (or transmission channel) indicated by another type of configuration signaling, how to determine a transmission direction (or transmission channel) is a problem to be resolved.

SUMMARY

Embodiments of this application provide a transmission direction determining method and apparatus, a transmission channel determining method and apparatus, and a computer storage medium.

Embodiments of this application provide a method for determining transmission direction, including:

obtaining, by a terminal, first configuration signaling, wherein the first configuration signaling indicates that one or more symbols in a slot are used to transmit data in a first transmission direction;

obtaining, by the terminal, second configuration signaling, wherein the second configuration signaling indicates that at least one of the one or more symbols in the slot is used to transmit data in a second transmission direction; and determining, by the terminal, transmitting data on the one or more symbols in the first transmission direction, and not transmitting data on the at least one of the one or more symbols in the second transmission direction, wherein the first configuration signaling is cell-specific radio resource control (RRC) signaling.

In the embodiments of this application, the second configuration signaling is semi-static UL/DL configuration signaling, dynamic scheduling signaling or user equipment (UE)-specific RRC signaling.

In the embodiments of this application, the determining, by the terminal, transmitting data on the one or more symbols in the first transmission direction includes:

determining, by the terminal, transmitting data on the one or more symbols in UL direction.

In the embodiments of this application, the determining, by the terminal, transmitting data on the one or more symbols in the first transmission direction includes:

determining, by the terminal, transmitting data on the one or more symbols in DL direction.

Embodiments of this application provide a terminal for determining transmission direction, comprising: a processor, a transceiver, memory and a plurality of computer executable instructions stored in the memory that, when executed by the processor, cause the terminal to implement the foregoing transmission direction determining method.

Embodiments of this application provide a non-transitory computer storage medium, storing a plurality of computer executable instructions thereon, wherein the computer executable instructions, when executed by a terminal having a processor and a transceiver, cause the terminal to implement the foregoing transmission direction determining method.

In the technical solutions of the embodiments of this application, a terminal receives first configuration signaling, and determines, based on the first configuration signaling, that a target resource corresponds to a first transmission direction, where the first configuration signaling is cell-specific RRC signaling; the terminal receives second configuration signaling, and determines, based on the second configuration signaling, that the target resource corresponds to a second transmission direction; and the terminal determines a direction of the target resource as the first transmission direction, and performs data transmission with a network device based on the first transmission direction. In the technical solutions of the embodiments of this application, when a direction of cell-specific RRC signaling configured transmission is different from a transmission direction indicated by another type of configuration signaling, the terminal determines a transmission direction according to a principle that cell-specific RRC signaling has a higher priority, thereby avoiding an error that occurs when the terminal receives configuration signaling with two different transmission directions.

BRIEF DESCRIPTION OF THE DRAWINGS

The accompanying drawings described herein are used for providing further understanding for this application and constitute a part of this application. Exemplary embodiments of this application and descriptions thereof are used for explaining this application and do not constitute an improper limitation to this application. In the accompanying drawings.

DETAILED DESCRIPTION

Figure 1:
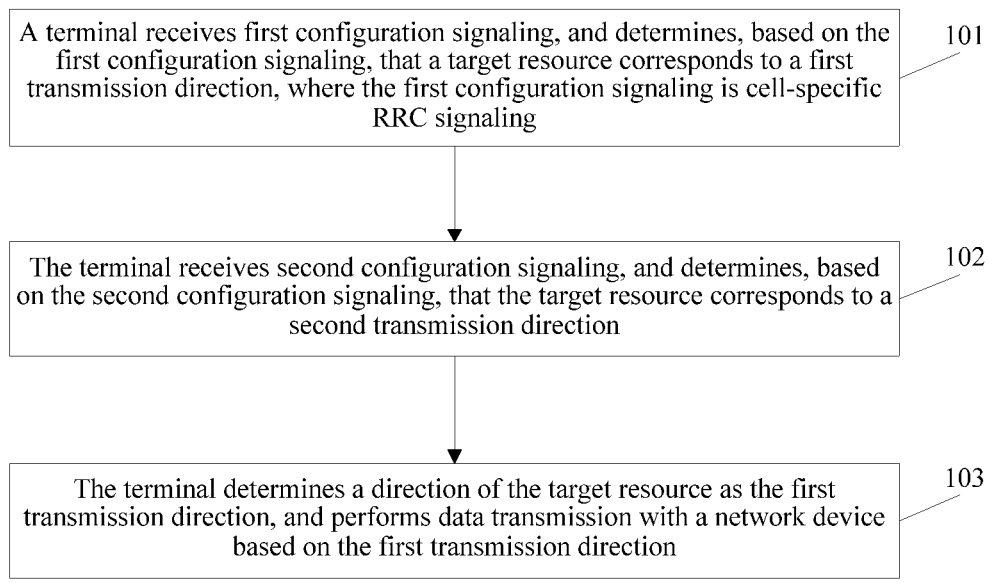
FIG. 1 is a schematic flowchart 1 of a transmission direction determining method according to an embodiment of this application.

For ease of understanding of the technical solutions in the embodiments of this application, related configuration signaling in the embodiments of this application are described below.

1) Semi-static UL/DL configuration signaling is used to implement semi-static UL/DL configuration. Specifically, a slot format within a configuration period (for example, 5 ms or 10 ms) is configured by using semi-static RRC signaling. The slot format may indicate quantities and positions of UL symbols, DL symbols, and flexible symbols in each slot within one configuration period.

Further, the semi-static UL/DL configuration signaling includes the following two cases.

1.1) Common semi-static UL/DL configuration signaling is used to implement semi-static UL/DL common configuration, which is also referred to as cell-specific semi-static UL/DL configuration.

1.2) Dedicated semi-static UL/DL configuration signaling is used to implement semi-static UL/DL dedicated configuration, which is also referred to as UE-specific semi-static UL/DL configuration.

2) Dynamic slot format indication signaling is used to implement a dynamic slot format indication. Specifically, the dynamic slot format indication signaling is carried in a group common PDCCH to be sent, and is used to dynamically indicate a slot format of each slot.

Further, the dynamic slot format indication signaling has the following two indication manners:

2.1) The dynamic slot format indication signaling indicates a direction in each symbol in each slot.

2.2) In combination with semi-static UL/DL configuration, the dynamic slot format indication signaling can only change a direction in a flexible symbol in the semi-static UL/DL configuration but cannot change a direction in a UL symbol and a direction in a DL symbol in the semi-static UL/DL configuration.

3) Dynamic scheduling signaling is used to implement dynamically scheduled data transmission. For example, data transmission scheduled by DCI is physical downlink shared channel (PDSCH)/physical uplink shared channel (PUSCH) transmission or physical uplink control channel (PUCCH) transmission that carries an acknowledgement (ACK)/negative-acknowledgement (NACK). For another example, measurement signal transmission scheduled by DCI is aperiodic channel state information (CSI)-reference signal (RS) transmission or aperiodic sounding reference signal (SRS) transmission. The data transmission or measurement signal transmission scheduled by DCI implicitly indicates whether its corresponding symbol is a DL symbol or a UL symbol.

4) UE-specific RRC signaling is used to implement UE-specific RRC signaling configured transmission, for example, periodic measurement signal transmission or physical random access channel (PRACH) transmission. UE-specific RRC signaling configured transmission also implicitly indicates whether its corresponding symbol is a DL symbol or a UL symbol. For example, a symbol corresponding to a periodic CSI-RS is a DL symbol, a symbol corresponding to a periodic SRS is a UL symbol, and a symbol corresponding to a PRACH is a UL symbol.

5) Cell-specific RRC signaling is used to implement cell-specific RRC signaling configured transmission, for example, transmission of SI such as remaining minimum SI (RMSI) or other SI (OSI). Cell-specific RRC signaling configured transmission similarly implicitly indicates whether its corresponding symbol is a DL symbol or a UL symbol.

A base station may explicitly or implicitly indicate a transmission direction in a symbol in a slot by using the foregoing configuration signaling. However, different configuration signaling may indicate different transmission directions. Based on this, the embodiments of this application provide the following technical solutions.

FIG. 1 is a schematic flowchart 1 of a transmission direction determining method according to an embodiment of this application. As shown in FIG. 1, the transmission direction determining method includes the following steps.

Step 101: A terminal receives first configuration signaling, and determines, based on the first configuration signaling, that a target resource corresponds to a first transmission direction, where the first configuration signaling is cell-specific RRC signaling.

Herein, the terminal may be a device capable of accessing a communication network, for example, a mobile phone, a tablet computer or a notebook computer.

In this embodiment of this application, the first configuration signaling is cell-specific RRC signaling. Cell-specific RRC signaling configured transmission implicitly indicates whether its corresponding symbol is a UL symbol or a DL symbol. For example, the following information is configured in cell-specific RRC signaling: If UL data is transmitted in the first symbol to the fourth symbol in a slot, a transmission direction in the first symbol to the fourth symbol in the slot is a UL transmission direction. For another example, the following information is configured in cell-specific RRC signaling: If DL data is transmitted in the third symbol to the eighth symbol in the slot, a transmission direction in the third symbol to the eighth symbol in the slot is a DL transmission direction. It can be seen that the cell-specific RRC signaling can determine quantities and locations of symbols occupied by data in a slot, and a UL/DL type of the data implicitly indicates a transmission direction in the symbols occupied by the data.

In this embodiment of this application, the target resource is at least one time domain symbol that is configured for data by the cell-specific RRC signaling. The UL/DL type of the data implicitly indicates the transmission direction of the target resource. In this embodiment of this application, the transmission direction implicitly indicated by the cell-specific RRC signaling is referred to as the first transmission direction.

Step 102: The terminal receives second configuration signaling, and determines, based on the second configuration signaling, that the target resource corresponds to a second transmission direction.

In this embodiment of this application, the second configuration signaling is semi-static UL/DL configuration signaling, dynamic scheduling signaling or UE-specific RRC signaling.

In the foregoing solution, the semi-static UL/DL configuration signaling is RRC signaling or SI.

In the foregoing solution, the dynamic scheduling signaling is DCI and/or a MAC CE.

1) The second configuration signaling is the semi-static UL/DL configuration signaling.

Herein, the semi-static UL/DL configuration signaling may be common semi-static UL/DL configuration signaling or dedicated semi-static UL/DL configuration signaling.

A slot format within a configuration period (for example, 5 ms or 10 ms) may be configured by using the semi-static UL/DL configuration signaling. Quantities and locations of UL symbols, DL symbols, and flexible symbols in each slot within a configuration period may be indicated by the slot format.

The semi-static UL/DL configuration signaling may explicitly indicate a transmission direction in each symbol in the slot, for example, a UL transmission direction, a DL transmission direction, and a flexible transmission direction.

Herein, a transmission direction in the flexible symbol is referred to as a flexible transmission direction. A symbol having a flexible transmission direction (that is, the flexible symbol) may be rewritten by using signaling for DL transmission or UL transmission. For example, a flexible transmission direction in a symbol is changed into a DL/UL direction by DCI.

2) The second configuration signaling is dynamic scheduling signaling.

Herein, dynamic scheduling signaling configured transmission implicitly indicates whether its corresponding symbol is a UL symbol or a DL symbol. The UL symbol represents that the transmission direction in the symbol is a UL transmission direction, and the DL symbol represents that the transmission direction in the symbol is a DL transmission direction.

3) The second configuration signaling is UE-specific RRC signaling.

Herein, UE-specific RRC signaling configured transmission implicitly indicates whether its corresponding symbol is a UL symbol or a DL symbol. The UL symbol represents that the transmission direction in the symbol is a UL transmission direction, and the DL symbol represents that the transmission direction in the symbol is a DL transmission direction.

Step 103: The terminal determines a direction of the target resource as the first transmission direction, and performs data transmission with a network device based on the first transmission direction.

The technical solutions of this embodiment of this application are respectively described below with reference to different implementations of the second configuration signaling.

1) It is determined, based on the cell-specific RRC signaling, that the target resource corresponds to a UL transmission direction, and it is determined, based on the semi-static UL/DL configuration signaling, that the target resource corresponds to a DL transmission direction and/or a flexible transmission direction. In this case, the terminal determines the direction of the target resource as a UL transmission direction, and sends UL data on the target resource.

2) It is determined, based on the cell-specific RRC signaling, that the target resource corresponds to a DL transmission direction, and it is determined, based on the semi-static UL/DL configuration signaling, that the target resource corresponds to a UL transmission direction and/or a flexible transmission direction. In this case, the terminal determines the direction of the target resource as a DL transmission direction, and receives DL data on the target resource.

3) It is determined, based on the cell-specific RRC signaling, that the target resource corresponds to a UL transmission direction, and it is determined, based on the dynamic scheduling signaling, that the target resource corresponds to a DL transmission direction. In this case, the terminal determines the direction of the target resource as a UL transmission direction, and sends UL data on the target resource.

4) It is determined, based on the cell-specific RRC signaling, that the target resource corresponds to a DL transmission direction, and it is determined, based on the dynamic scheduling signaling, that the target resource corresponds to a UL transmission direction. The terminal determines the direction of the target resource as a DL transmission direction, and receives DL data on the target resource.

5) It is determined, based on the cell-specific RRC signaling, that the target resource corresponds to a UL transmission direction, and it is determined, based on the UE-specific RRC signaling, that the target resource corresponds to a DL transmission direction. In this case, the terminal determines the direction of the target resource as a UL transmission direction, and sends UL data on the target resource.

6) It is determined, based on the cell-specific RRC signaling, that the target resource corresponds to a DL transmission direction, and it is determined, based on the UE-specific RRC signaling, that the target resource corresponds to a UL transmission direction. The terminal determines the direction of the target resource as a DL transmission direction, and receives DL data on the target resource.

In the foregoing solution, the target resource includes one or more symbols.

In the technical solutions of the embodiments of this application, when a direction of cell-specific RRC signaling configured transmission is different from a transmission direction indicated by another type of configuration signaling, the terminal determines a transmission direction according to a principle that cell-specific RRC signaling has a higher priority, thereby avoiding an error that occurs when the terminal receives configuration signaling with two different transmission directions.

Figure 2:
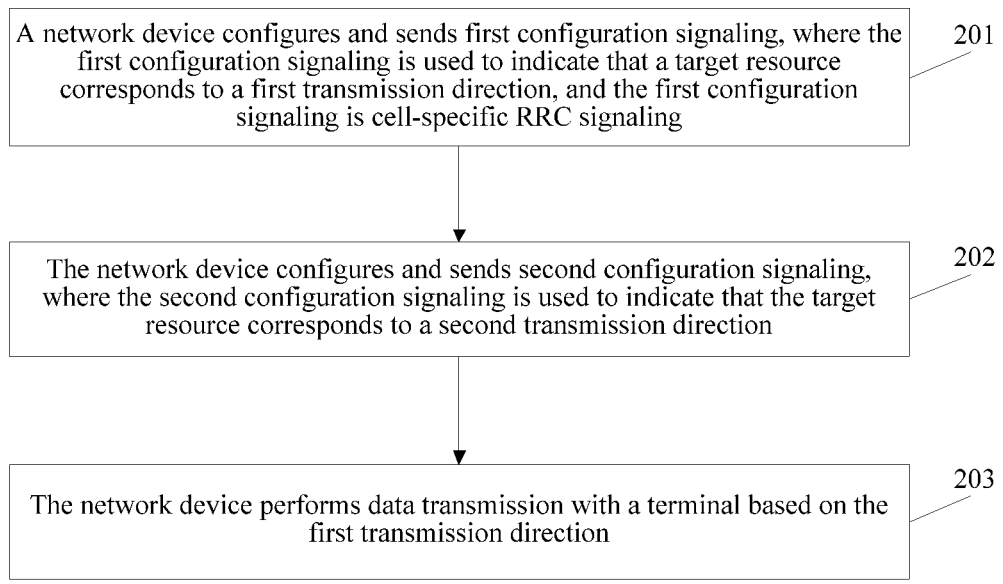
FIG. 2 is a schematic flowchart 2 of a transmission direction determining method according to an embodiment of this application.

FIG. 2 is a schematic flowchart 2 of a transmission direction determining method according to an embodiment of this application. As shown in FIG. 2, the transmission direction determining method includes the following steps.

Step 201: A network device configures and sends first configuration signaling, where the first configuration signaling is used to indicate that a target resource corresponds to a first transmission direction, and the first configuration signaling is cell-specific RRC signaling.

Step 202: The network device configures and sends second configuration signaling, where the second configuration signaling is used to indicate that the target resource corresponds to a second transmission direction.

In this embodiment of this application, the second configuration signaling is semi-static UL/DL configuration signaling, dynamic scheduling signaling or UE-specific RRC signaling.

In the foregoing solution, the semi-static UL/DL configuration signaling is RRC signaling or SI.

In the foregoing solution, the dynamic scheduling signaling is DCI and/or a MAC CE.

In this embodiment of this application, if the second configuration signaling is the semi-static UL/DL configuration signaling, the configuring, by the network device, second configuration signaling includes:

configuring, by the network device, the second configuration signaling based on the first configuration signaling, where if data configured by the first configuration signaling is UL data, a transmission direction is configured as a UL transmission direction or a flexible transmission direction on a target resource, corresponding to the UL data, in the second configuration signaling; or if the data configured by the first configuration signaling is DL data, a transmission direction is configured as a DL transmission direction or a flexible transmission direction on a target resource, corresponding to the DL data, in the second configuration signaling.

Herein, the target resource includes one or more symbols.

Step 203: The network device performs data transmission with a terminal based on the first transmission direction.

In this embodiment of this application, the network device corresponds to a terminal side, and data transmission needs to be performed with the terminal based on the first transmission direction.

The technical solutions of this embodiment of this application are further described below with reference to specific application examples.

Application Example 1

Cell-specific RRC signaling configured transmission and semi-static UL/DL configuration signaling configured transmission. Specifically, a base station indicates a data transmission direction by using cell-specific RRC signaling configured transmission. In addition, the base station can also indicate that a direction of a symbol in a slot is UL/DL or flexible by using the semi-static UL/DL configuration signaling.

If cell-specific RRC signaling configured transmission indicates that the transmission direction is DL, the DL data can only be transmitted in a DL symbol or a flexible symbol in a semi-static UL/DL configuration.

If cell-specific RRC signaling configured transmission indicates that the transmission direction is UL, the UL data can only be transmitted in a UL symbol or a flexible symbol in a semi-static UL/DL configuration.

The terminal does not expect that a transmission direction in a symbol in cell-specific RRC signaling configured transmission is opposite a transmission direction in a symbol indicated by the semi-static UL/DL configuration signaling. For example, a direction of cell-specific RRC signaling configured transmission is DL, while the semi-static UL/DL configuration signaling indicates that a direction of a symbol is UL; or a direction of cell-specific RRC signaling configured transmission is UL, while the semi-static UL/DL configuration signaling indicates that a direction of a symbol is DL.

If the transmission direction in a symbol in cell-specific RRC signaling configured transmission is opposite the transmission direction in a symbol indicated by the semi-static UL/DL configuration signaling, the terminal determines that the transmission direction is the direction indicated by the cell-specific RRC signaling.

Application Example 2

Cell-specific RRC signaling configured transmission and dynamic scheduling signaling configured transmission. Specifically, a base station indicates a data transmission direction by using cell-specific RRC signaling configured transmission. The base station may also perform data transmission by means of dynamic scheduling signaling. The data transmission corresponds to a fixed transmission direction. For example, a PDSCH scheduled by DCI is DL transmission, and a PUSCH scheduled by DCI or a PUCCH carrying an ACK/NACK is UL transmission. For another example, a symbol of non-periodic CSI-RS transmission scheduled by DCI is a DL symbol, and a symbol of non-periodic SRS transmission scheduled by DCI is a UL symbol.

If cell-specific RRC signaling configured transmission indicates that a transmission direction in a symbol in data transmission is DL, while dynamic scheduling signaling configured transmission indicates that a transmission direction in a symbol in dynamic data transmission is UL, the terminal uses a symbol as a DL symbol and receives DL data.

If cell-specific RRC signaling configured transmission indicates that a transmission direction in a symbol in data transmission is UL, while dynamic scheduling signaling configured transmission indicates that a transmission direction in a symbol in dynamic data transmission is DL, the terminal uses a symbol as a UL symbol and transmits UL data.

Application Example 3

Cell-specific RRC signaling configured transmission and UE-specific RRC signaling configured transmission. Specifically, a base station indicates a data transmission direction by using cell-specific RRC signaling configured transmission. The base station may also configure data transmission by means of UE-specific RRC signaling. For example, measurement signal transmission is configured by the UE-specific RRC signaling, and the measurement signal transmission corresponds to a fixed transmission direction. For example, a symbol of periodic CSI-RS transmission configured by UE-specific RRC signaling is a DL symbol, and a symbol of periodic CSI-RS transmission configured by UE-specific RRC signaling is a UL symbol.

If cell-specific RRC signaling configured transmission indicates that a transmission direction in a symbol in data transmission is DL, while UE-specific RRC signaling configured transmission indicates that a transmission direction in a symbol in data transmission is UL, the terminal uses a symbol as a DL symbol and receives DL data.

If cell-specific RRC signaling configured transmission indicates that a transmission direction in a symbol in data transmission is UL, while UE-specific RRC signaling configured transmission indicates that a transmission direction in a symbol in data transmission is DL, the terminal uses a symbol as a UL symbol and transmits UL data.

Figure 3:
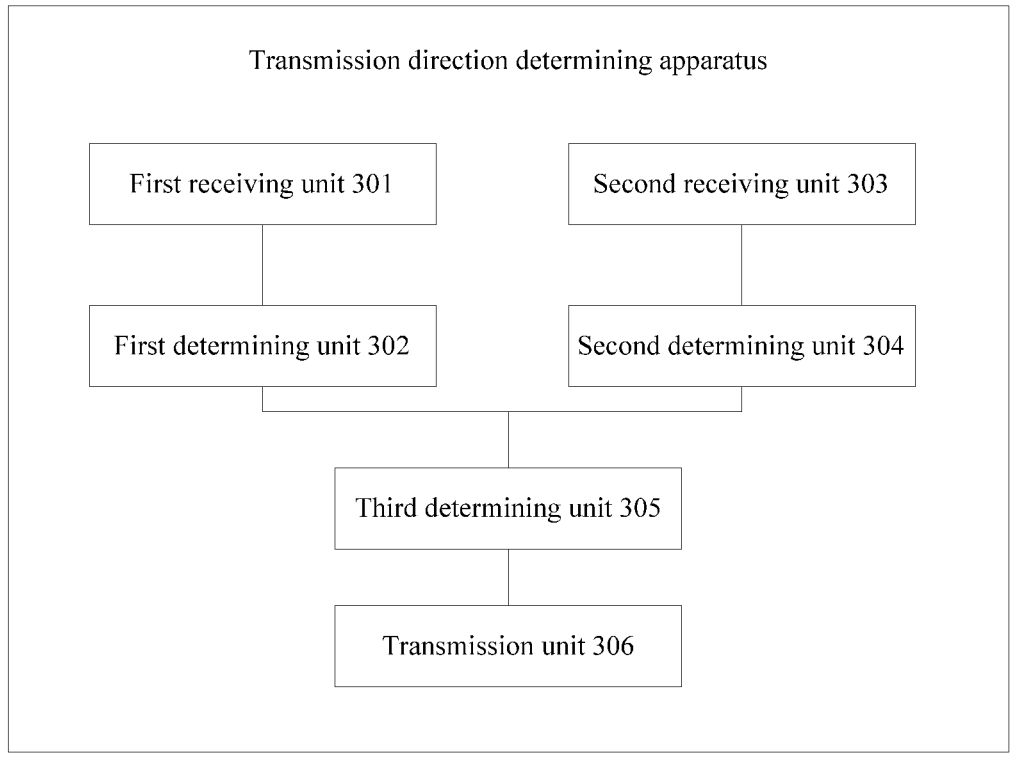
FIG. 3 is a schematic structural diagram 1 of a transmission direction determining apparatus according to an embodiment of this application.

FIG. 3 is a schematic structural diagram 1 of a transmission direction determining apparatus according to an embodiment of this application. As shown in FIG. 3, the apparatus includes:

a first receiving unit 301, configured to receive first configuration signaling;

a first determining unit 302, configured to determine, based on the first configuration signaling, that a target resource corresponds to a first transmission direction, where the first configuration signaling is cell-specific RRC signaling;

a second receiving unit 303, configured to receive second configuration signaling;

a second determining unit 304, configured to determine, based on the second configuration signaling, that the target resource corresponds to a second transmission direction;

a third determining unit 305, configured to determine a direction of the target resource as the first transmission direction; and a transmission unit 306, configured to perform data transmission with a network device based on the first transmission direction.

In an implementation, the second configuration signaling is semi-static UL/DL configuration signaling, dynamic scheduling signaling or UE-specific RRC signaling.

In an implementation, the semi-static UL/DL configuration signaling is RRC signaling or SI.

In an implementation, the dynamic scheduling signaling is DCI and/or a MAC CE.

In an implementation, the first determining unit 302 is configured to determine, based on the cell-specific RRC signaling, that the target resource corresponds to a UL transmission direction;

the second determining unit 304 is configured to determine, based on the semi-static UL/DL configuration signaling, that the target resource corresponds to a DL transmission direction and/or a flexible transmission direction;

the third determining unit 305 is configured to determine the direction of the target resource as a UL transmission direction; and the transmission unit 306 is configured to send UL data on the target resource.

In an implementation, the first determining unit 302 is configured to determine, based on the cell-specific RRC signaling, that the target resource corresponds to a DL transmission direction;

the second determining unit 304 is configured to determine, based on the semi-static UL/DL configuration signaling, that the target resource corresponds to a UL transmission direction and/or a flexible transmission direction;

the third determining unit 305 is configured to determine a direction of the target resource as a DL transmission direction; and the transmission unit 306 is configured to receive DL data on the target resource.

In an implementation, the first determining unit 302 is configured to determine, based on the cell-specific RRC signaling, that the target resource corresponds to a UL transmission direction;

the second determining unit 304 is configured to determine, based on the dynamic scheduling signaling, that the target resource corresponds to a DL transmission direction;

the third determining unit 305 is configured to determine the direction of the target resource as a UL transmission direction; and the transmission unit 306 is configured to send UL data on the target resource.

In an implementation, the first determining unit 302 is configured to determine, based on the cell-specific RRC signaling, that the target resource corresponds to a DL transmission direction;

the second determining unit 304 is configured to determine, based on the dynamic scheduling signaling, that the target resource corresponds to a UL transmission direction;

the third determining unit 305 is configured to determine a direction of the target resource as a DL transmission direction; and the transmission unit 306 is configured to receive DL data on the target resource.

In an implementation, the first determining unit 302 is configured to determine, based on the cell-specific RRC signaling, that the target resource corresponds to a UL transmission direction;

the second determining unit 304 is configured to determine, based on the UE-specific RRC signaling, that the target resource corresponds to a DL transmission direction;

the third determining unit 305 is configured to determine the direction of the target resource as a UL transmission direction; and the transmission unit 306 is configured to send UL data on the target resource.

In an implementation, the first determining unit 302 is configured to determine, based on the cell-specific RRC signaling, that the target resource corresponds to a DL transmission direction;

the second determining unit 304 is configured to determine, based on the UE-specific RRC signaling, that the target resource corresponds to a UL transmission direction;

the third determining unit 305 is configured to determine a direction of the target resource as a DL transmission direction; and the transmission unit 306 is configured to receive DL data on the target resource.

In the foregoing solution, the target resource includes one or more symbols.

A person skilled in the art should understand that for the implementation functions of the units in the transmission direction determining apparatus shown in FIG. 3, refer to the related description of the foregoing transmission direction determining method. The functions of the units in the transmission direction determining apparatus shown in FIG. 3 may be implemented by a program running on a processor or may be implemented by a specific logic circuit.

Figure 4:
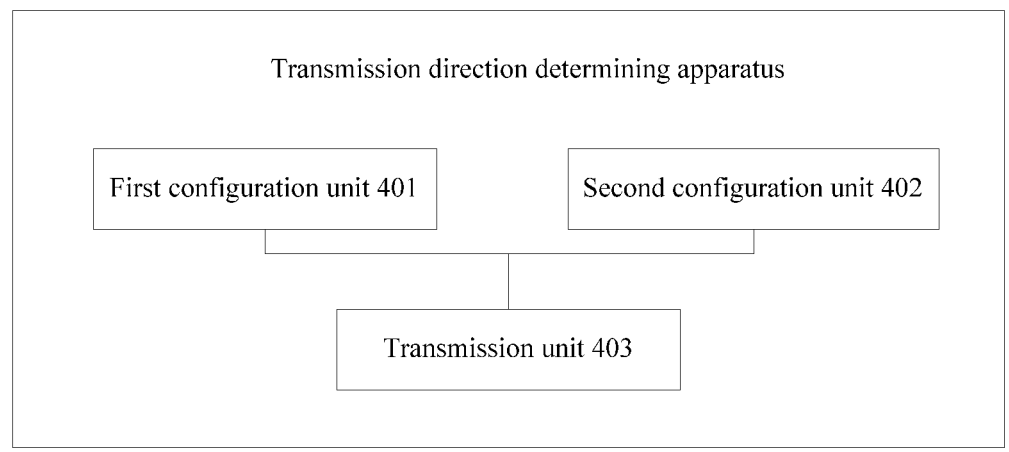
FIG. 4 is a schematic structural diagram 2 of a transmission direction determining apparatus according to an embodiment of this application.

FIG. 4 is a schematic structural diagram 2 of a transmission direction determining apparatus according to an embodiment of this application. As shown in FIG. 4, the apparatus includes:

a first configuration unit 401, configured to configure and send first configuration signaling, where the first configuration signaling is used to indicate that a target resource corresponds to a first transmission direction, and the first configuration signaling is cell-specific RRC signaling;

a second configuration unit 402, configured to configure and send second configuration signaling, where the second configuration signaling is used to indicate that the target resource corresponds to a second transmission direction; and a transmission unit 403, configured to perform data transmission with a terminal based on the first transmission direction.

In an implementation, the second configuration signaling is semi-static UL/DL configuration signaling, dynamic scheduling signaling or UE-specific RRC signaling.

In an implementation, the semi-static UL/DL configuration signaling is RRC signaling or SI.

In an implementation, the dynamic scheduling signaling is DCI and/or a MAC CE.

In an implementation, if the second configuration signaling is the semi-static UL/DL configuration signaling, the second configuration unit 402 is configured to configure the second configuration signaling based on the first configuration signaling.

If data configured by the first configuration signaling is UL data, a transmission direction is configured as a UL transmission direction or a flexible transmission direction on a target resource, corresponding to the UL data, in the second configuration signaling, or if the data configured by the first configuration signaling is DL data, a transmission direction is configured as a DL transmission direction or a flexible transmission direction on a target resource, corresponding to the DL data, in the second configuration signaling.

In an implementation, the target resource includes one or more symbols.

A person skilled in the art should understand that for the implementation functions of the units in the transmission direction determining apparatus shown in FIG. 4, refer to the related description of the foregoing transmission direction determining method. The functions of the units in the transmission direction determining apparatus shown in FIG. 4 may be implemented by a program running on a processor or may be implemented by a specific logic circuit.

Figure 5:
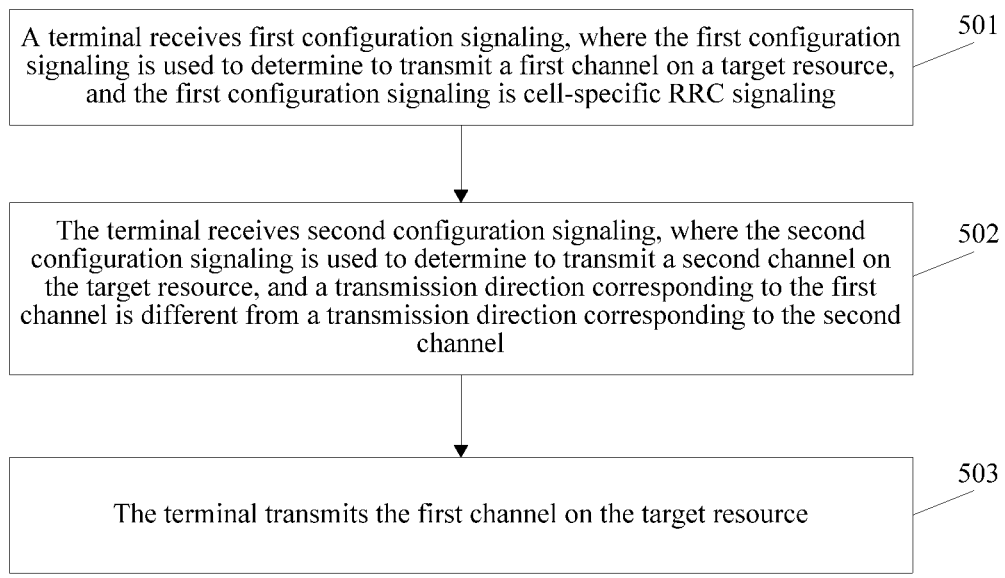
FIG. 5 is a schematic flowchart 1 of a transmission channel determining method according to an embodiment of this application.

FIG. 5 is a schematic flowchart 1 of a transmission channel determining method according to an embodiment of this application. As shown in FIG. 5, the transmission channel determining method includes the following steps.

Step 501: A terminal receives first configuration signaling, where the first configuration signaling is used to determine to transmit a first channel on a target resource, and the first configuration signaling is cell-specific RRC signaling.

Herein, the terminal may be a device capable of accessing a communication network, for example, a mobile phone, a tablet computer or a notebook computer.

In this embodiment of this application, the first configuration signaling is cell-specific RRC signaling, and the cell-specific RRC signaling is used to configure the target resource for transmitting the first channel. Herein, the first channel can be a UL channel or a DL channel.

In an implementation, the first channel is a DL channel, a transmission direction corresponds to the first channel is a DL direction, and the terminal receives the first channel on the target resource. In another implementation, the first channel is a UL channel, the transmission direction corresponds to the first channel is a UL direction, and the terminal sends the first channel on the target resource.

In this embodiment of this application, the target resource is at least one time domain symbol that is configured for the first channel by the cell-specific RRC signaling.

Step 502: The terminal receives second configuration signaling, where the second configuration signaling is used to determine to transmit a second channel on the target resource, and a transmission direction corresponding to the first channel is different from a transmission direction corresponding to the second channel.

In this embodiment of this application, the second configuration signaling may be semi-static UL/DL configuration signaling, dynamic scheduling signaling or UE-specific RRC signaling.

In the foregoing solution, the semi-static UL/DL configuration signaling is RRC signaling or SI. Further, the semi-static UL/DL configuration signaling may be common semi-static UL/DL configuration signaling or dedicated semi-static UL/DL configuration signaling.

In the foregoing solution, the dynamic scheduling signaling is DCI and/or a MAC CE.

In an implementation, the second channel is a DL channel, a transmission direction corresponding to the second channel is a DL direction, and the terminal receives the second channel on the target resource. In another implementation, the second channel is a UL channel, a transmission direction corresponding to the second channel is a UL direction, and the terminal sends the second channel on the target resource.

Step 503: The terminal transmits the first channel on the target resource.

Specifically, the terminal receives the first channel on the target resource if the transmission direction corresponding to the first channel is a DL direction; or the terminal sends the first channel on the target resource if the transmission direction corresponding to the first channel is a UL direction.

The technical solutions of this embodiment of this application are respectively described below with reference to different implementations of the second configuration signaling.

1) It is determined, based on the cell-specific RRC signaling, that the target resource is used to transmit a UL channel, and it is determined, based on the semi-static UL/DL configuration signaling, that the target resource is used to transmit a DL channel. In this case, the terminal transmits a UL channel on the target resource.

2) It is determined, based on the cell-specific RRC signaling, that the target resource is used to transmit a DL channel, and it is determined, based on the semi-static UL/DL configuration signaling, that the target resource is used to transmit a UL channel. In this case, the terminal transmits a DL channel on the target resource.

3) It is determined, based on the cell-specific RRC signaling, that the target resource is used to transmit a UL channel, and it is determined, based on the dynamic scheduling signaling, that the target resource is used to transmit a DL channel. In this case, the terminal transmits a UL channel on the target resource.

4) It is determined, based on the cell-specific RRC signaling, that the target resource is used to transmit a DL channel, and it is determined, based on the dynamic scheduling signaling, that the target resource is used to transmit a UL channel. The terminal transmits a DL channel on the target resource.

5) It is determined, based on the cell-specific RRC signaling, that the target resource is used to transmit a UL channel, and it is determined, based on the UE-specific RRC signaling, that the target resource is used to transmit a DL channel. In this case, the terminal transmits a UL channel on the target resource.

6) It is determined, based on the cell-specific RRC signaling, that the target resource is used to transmit a DL channel, and it is determined, based on the UE-specific RRC signaling, that the target resource is used to transmit a UL channel. The terminal transmits a DL channel on the target resource.

Figure 6:
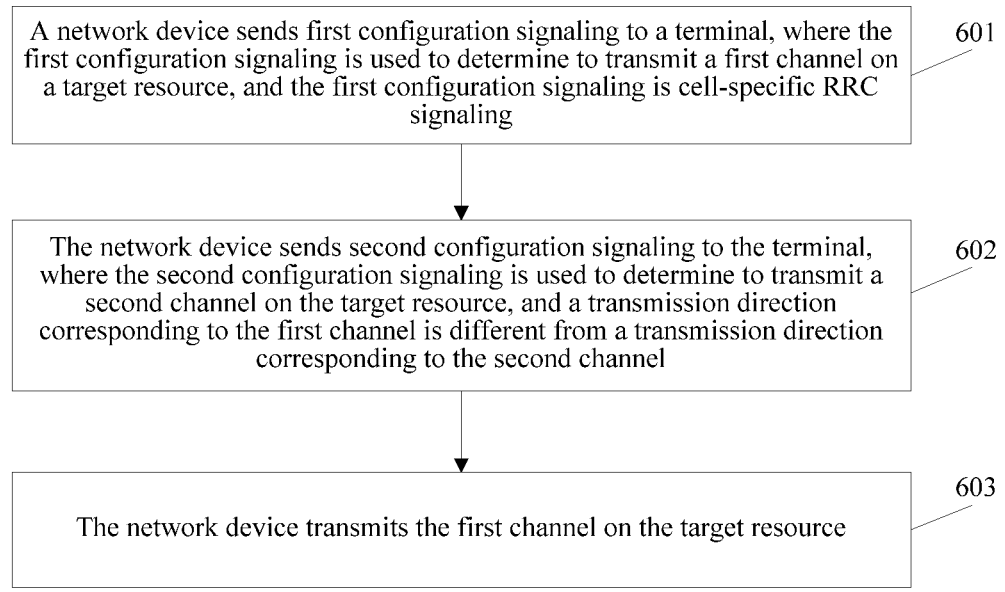
FIG. 6 is a schematic flowchart 2 of a transmission channel determining method according to an embodiment of this application.

FIG. 6 is a schematic flowchart 2 of a transmission channel determining method according to an embodiment of this application. As shown in FIG. 6, the transmission channel determining method includes the following steps.

Step 601: A network device sends first configuration signaling to a terminal, where the first configuration signaling is used to determine to transmit a first channel on a target resource, and the first configuration signaling is cell-specific RRC signaling.

In this embodiment of this application, the transmitting the first channel on the target resource includes:

sending, by the network device, the first channel on the target resource if a transmission direction corresponding to the first channel is a DL direction; or receiving, by the network device, the first channel on the target resource if a transmission direction corresponding to the first channel is a UL direction.

Step 602: The network device sends second configuration signaling to the terminal, where the second configuration signaling is used to determine to transmit a second channel on the target resource, and a transmission direction corresponding to the first channel is different from a transmission direction corresponding to the second channel.

In this embodiment of this application, the second configuration signaling is semi-static UL/DL configuration signaling, dynamic scheduling signaling or UE-specific RRC signaling.

In the foregoing solution, the semi-static UL/DL configuration signaling is RRC signaling or SI.

In the foregoing solution, the dynamic scheduling signaling is DCI and/or a MAC CE.

In this embodiment of this application, the transmitting the second channel on the target resource includes:

sending, by the network device, the second channel on the target resource if the transmission direction corresponding to the second channel is a DL direction; or receiving, by the network device, the second channel on the target resource if the transmission direction corresponding to the second channel is a UL direction.

Step 603: The network device transmits the first channel on the target resource.

In this embodiment of this application, the network device sends the first channel on the target resource if the transmission direction corresponding to the first channel is a DL direction; or the network device receives the first channel on the target resource if the transmission direction corresponding to the first channel is a UL direction.

In this embodiment of this application, the target resource includes one or more time domain symbols.

Figure 7:
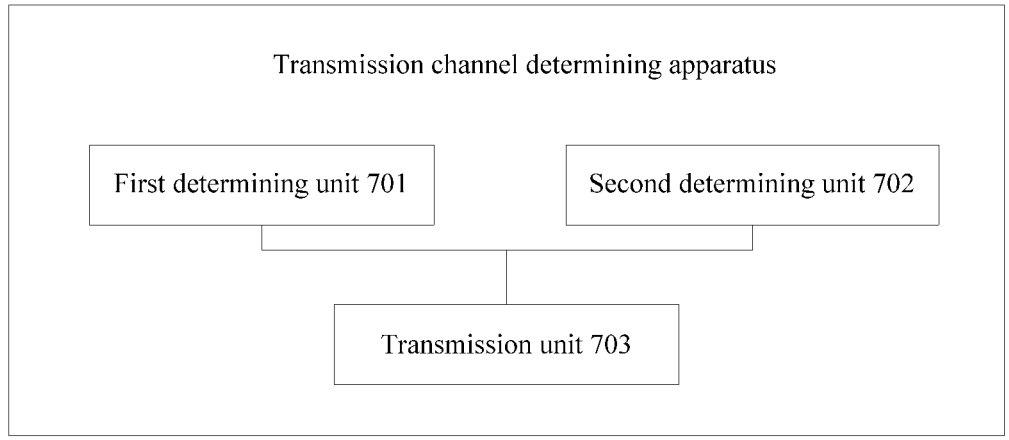
FIG. 7 is a schematic structural diagram 1 of a transmission channel determining apparatus according to an embodiment of this application.

FIG. 7 is a schematic structural diagram 1 of a transmission channel determining apparatus according to an embodiment of this application. As shown in FIG. 7, the apparatus includes:

a first determining unit 701, configured to receive first configuration signaling, where the first configuration signaling is used to determine to transmit a first channel on a target resource, and the first configuration signaling is cell-specific RRC signaling;

a second determining unit 702, configured to receive second configuration signaling, where the second configuration signaling is used to determine to transmit a second channel on the target resource, and a transmission direction corresponding to the first channel is different from a transmission direction corresponding to the second channel; and a transmission unit 703, configured to transmit the first channel on the target resource.

In an implementation, the second configuration signaling is semi-static UL/DL configuration signaling, dynamic scheduling signaling or UE-specific RRC signaling.

In an implementation, the semi-static UL/DL configuration signaling is RRC signaling or SI.

In an implementation, the dynamic scheduling signaling is DCI and/or a MAC CE.

In an implementation, the transmitting the first channel on the target resource includes:

receiving, by a terminal, the first channel on the target resource if the transmission direction corresponding to the first channel is a DL direction; or sending, by a terminal, the first channel on the target resource if the transmission direction corresponding to the first channel is a UL direction.

In an implementation, the transmitting the second channel on the target resource includes:

receiving, by the terminal, the second channel on the target resource if the transmission direction corresponding to the second channel is a DL direction; or sending, by the terminal, the second channel on the target resource if the transmission direction corresponding to the second channel is a UL direction.

In an implementation, the transmission unit 703 receives the first channel on the target resource if the transmission direction corresponding to the first channel is a DL direction; or the transmission unit 703 sends the first channel on the target resource if the transmission direction corresponding to the first channel is a UL direction.

In an implementation, the target resource includes one or more time domain symbols.

A person skilled in the art should understand that for the implementation functions of the units in the transmission channel determining apparatus shown in FIG. 7, refer to the related description of the foregoing transmission channel determining method. The functions of the units in the transmission channel determining apparatus shown in FIG. 7 may be implemented by a program running on a processor or may be implemented by a specific logic circuit.

Figure 8:
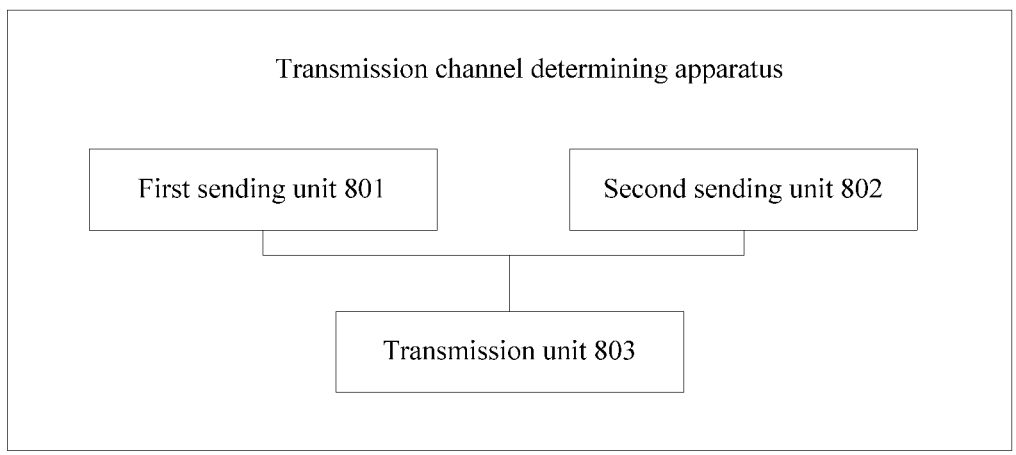
FIG. 8 is a schematic structural diagram 2 of a transmission channel determining apparatus according to an embodiment of this application.

FIG. 8 is a schematic structural diagram 2 of a transmission channel determining apparatus according to an embodiment of this application. As shown in FIG. 8, the apparatus includes:

a first sending unit 801, configured to send first configuration signaling to a terminal, where the first configuration signaling is used to determine to transmit a first channel on a target resource, and the first configuration signaling is cell-specific RRC signaling;

a second sending unit 802, configured to send second configuration signaling to the terminal, where the second configuration signaling is used to determine to transmit a second channel on the target resource, and a transmission direction corresponding to the first channel is different from a transmission direction corresponding to the second channel; and a transmission unit 803, configured to transmit the first channel on the target resource.

In an implementation, the second configuration signaling is semi-static UL/DL configuration signaling, dynamic scheduling signaling or UE-specific RRC signaling.

In an implementation, the semi-static UL/DL configuration signaling is RRC signaling or SI.

In an implementation, the dynamic scheduling signaling is DCI and/or a MAC CE.

In an implementation, the transmitting the first channel on the target resource includes:

sending, by the network device, the first channel on the target resource if the transmission direction corresponding to the first channel is a DL direction; or receiving, by the network device, the first channel on the target resource if the transmission direction corresponding to the first channel is a UL direction.

In an implementation, the transmitting the second channel on the target resource includes:

sending, by the network device, the second channel on the target resource if the transmission direction corresponding to the second channel is a DL direction; or receiving, by the network device, the second channel on the target resource if the transmission direction corresponding to the second channel is a UL direction.

In an implementation, the transmission unit 803 sends the first channel on the target resource if the transmission direction corresponding to the first channel is a DL direction; or the transmission unit 803 receives the first channel on the target resource if the transmission direction corresponding to the first channel is a UL direction.

In an implementation, the target resource includes one or more time domain symbols.

A person skilled in the art should understand that for the implementation functions of the units in the transmission channel determining apparatus shown in FIG. 8, refer to the related description of the foregoing transmission channel determining method. The functions of the units in the transmission channel determining apparatus shown in FIG. 8 may be implemented by a program running on a processor or may be implemented by a specific logic circuit.

When implemented in the form of software functional modules and sold or used as independent products, the foregoing transmission direction determining apparatus in the embodiments of this application may be alternatively stored in a computer-readable storage medium. Based on such an understanding, the technical solutions of this application essentially, or the part contributing to the prior art may be implemented in the form of a software product. The computer software product is stored in a storage medium, and includes several instructions for instructing a computer device (which may be a personal computer, a server, a network device, and the like) to perform all or some of the methods described in the embodiments of this application. The foregoing storage medium includes: any medium that can store program code, such as a USB flash drive, a removable hard disk, a read-only memory (ROM), a magnetic disk, or a compact disc. In this way, the embodiments of this application are not limited to any specific combination of hardware and software.

Correspondingly, an embodiment of this application further provides a computer storage medium, storing a computer executable instruction thereon, where the computer executable instruction is executed by a processor to implement the foregoing transmission direction determining method according to the embodiments of this application.

Figure 9:
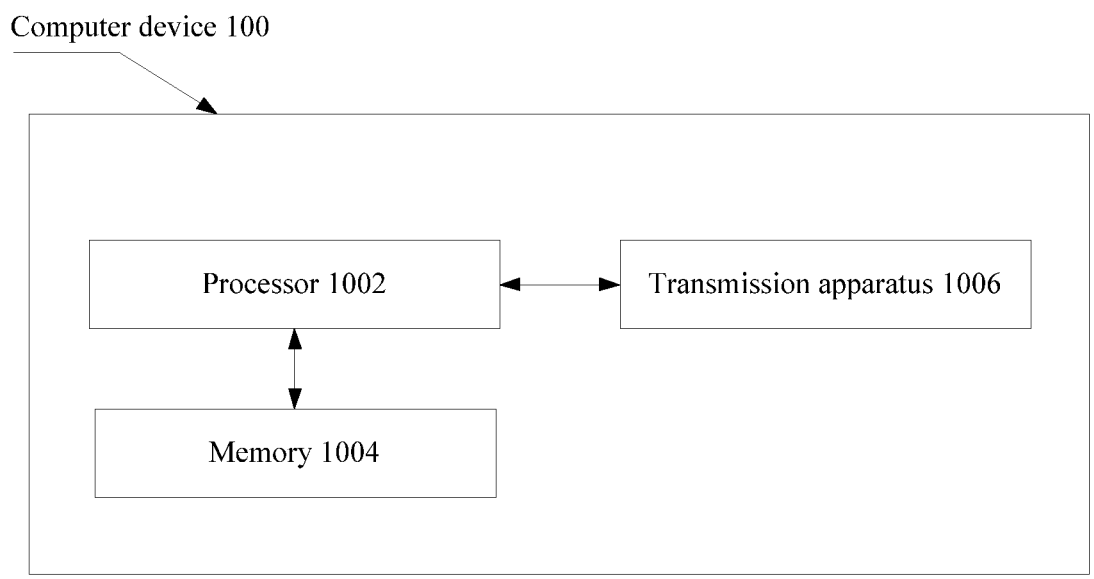
FIG. 9 is a schematic structural diagram of a computer device according to an embodiment of this application.

FIG. 9 is a schematic structural diagram of a computer device according to an embodiment of this application. The computer device may be a terminal or a network device. As shown in FIG. 9, the computer device 100 may include one or more (only one is shown the figure) processors 1002 (the processor 1002 may be, but is not limited to, a processing apparatus such as a microcontroller unit (MCU) or a programmable logic device (a field-programmable gate array (FPGA))), a memory 1004 configured to store data, and a transmission apparatus 1006 configured to implement a communication function. A person of ordinary skill in the art may understand that the structure shown in FIG. 9 is only for the purpose of illustration, and does not constitute a limitation to the structure of the foregoing electronic apparatus. For example, the computer device 100 may include more or fewer components than those shown in FIG. 9, or have a configuration different from that shown in FIG. 9.

The memory 1004 may be configured to store a software program and module of application software, such as a program instruction/module corresponding to the paging time determining method in the embodiments of this application. The processor 1002 runs the software program and module stored in memory 1004, to execute various functional applications and data processing, that is, implement the foregoing method. The memory 1004 may include a high-speed random access memory, and may also include a nonvolatile memory, for example, one or more magnetic storage devices, flash memories or other nonvolatile solid-state memories. In some examples, the memory 1004 may further include memories remotely disposed relative to the processor 1002, and these remote memories may be connected to the computer device 100 through a network. Examples of the network include, but are not limited to, the internet, an intranet, a local area network, a mobile communications network, and a combination thereof.

The transmission apparatus 1006 is configured to receive or send data through a network. A specific example of the foregoing network may include a wireless network provided by a communication provider of the computer device 100. In an example, the transmission apparatus 1006 includes a network interface controller (NIC), which may be connected to another network device through a base station to communicate with the internet. In an example, the transmission apparatus 1006 may be a radio frequency (RF) module that is configured to communicate with the internet wirelessly.

The technical solutions of the embodiments of this application may be arbitrarily combined with each other as long as there is no contradiction.

In the several embodiments provided in this application, it should be understood that the disclosed methods and intelligent devices may be implemented in other manners. The described device embodiments are merely examples. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections between the components may be implemented through some interfaces, indirect couplings or communication connections between the devices or units, or electrical connections, mechanical connections or connections in other forms.

The units described as separation parts may be or may not be physically separated. The part used as a display unit may be or may not be a physical unit. That is, the units may be located in the same place, or may be distributed to many network units. Some or all of the units need to be selected according to actual requirements to achieve the purpose of the solutions of the embodiments.

In addition, functional units in the embodiments of this application may be integrated into a second processing unit, or each of the units may serve as a unit alone, or two or more units may be integrated into one unit. The integrated unit may be implemented in the form of hardware, or may be implemented in the form of combining hardware and a software functional unit.

The descriptions are only specific implementations of this application, but are not intended to limit the protection scope of this application. Any variation or replacement readily figured out by a person skilled in the art within the technical scope disclosed in this application shall fall within the protection scope of this application.

What I claim is:

1. A method for determining transmission direction, comprising: sending, by a network device, first configuration signaling to a terminal, wherein the first configuration signaling implicitly indicates that one or more symbols in a slot are used to transmit data in a first transmission direction;

sending, by the network device, second configuration signaling to the terminal, wherein the second configuration signaling explicitly or implicitly indicates that at least one of the one or more symbols in the slot is used to transmit data in a second transmission direction; and wherein the first configuration signaling has a higher priority than the second configuration signaling, transmitting, by the network device, data on the one or more symbols in the first transmission direction, and not transmitting data on the at least one of the one or more symbols in the second transmission direction;

wherein the first configuration signaling is cell-specific radio resource control (RRC) signaling.

2. The method according to claim 1, wherein the second configuration signaling is semi-static uplink (UL)/downlink (DL) configuration signaling, downlink control information (DCI) signaling, or user equipment (UE)-specific RRC signaling.

3. The method according to claim 2, wherein the one or more symbols in the slot are used to transmit data in a first transmission direction comprises that:

the one or more symbols in the slot, indicated by the cell-specific RRC signaling, are used to transmit data in uplink (UL) direction; and the at least one of the one or more symbols in the slot is used to transmit data in a second transmission direction comprises that:

the at least one of the one or more symbols in the slot, indicated by the DCI signaling, is used to transmit data in downlink (DL) direction.

4. The method according to claim 2, wherein the one or more symbols in the slot are used to transmit data in a first transmission direction comprises that:

the one or more symbols in the slot, indicated by the cell-specific RRC signaling, are used to transmit data in DL direction; and the at least one of the one or more symbols in the slot is used to transmit data in a second transmission direction comprises that:

the at least one of the one or more symbols in the slot, indicated by the DCI signaling, is used to transmit data in UL direction.

5. The method according to claim 2, wherein the one or more symbols in the slot are used to transmit data in a first transmission direction comprises that:

the one or more symbols in the slot, indicated by the cell-specific RRC signaling, are used to transmit data in UL direction; and the at least one of the one or more symbols in the slot is used to transmit data in a second transmission direction comprises that:

the at least one of the one or more symbols in the slot, indicated by the UE-specific RRC signaling, is used to transmit data in DL direction.

6. The method according to claim 2, wherein the one or more symbols in the slot are used to transmit data in a first transmission direction comprises that:

the one or more symbols in the slot, indicated by the cell-specific RRC signaling, are used to transmit data in DL direction; and the at least one of the one or more symbols in the slot is used to transmit data in a second transmission direction comprises that:

the at least one of the one or more symbols in the slot, indicated by the UE-specific RRC signaling, is used to transmit data in UL direction.

7. The method according to claim 1, wherein the transmitting, by the network device, data on the one or more symbols in the first transmission direction comprises: transmitting data on the one or more symbols in UL direction.

8. The method according to claim 1, wherein the transmitting, by the network device data on the one or more symbols in the first transmission direction comprises: transmitting data on the one or more symbols in DL direction.

9. A network device for determining transmission direction, comprising:

a processor;
a transceiver;
memory; and
a plurality of computer executable instructions stored in the memory that, when executed by the processor, cause a network device to perform a plurality of operations including:

sending, first configuration signaling to a terminal, wherein the first configuration signaling implicitly indicates that one or more symbols in a slot are used to transmit data in a first transmission direction;

sending, second configuration signaling to the terminal, wherein the second configuration signaling explicitly or implicitly indicates that at least one of the one or more symbols in the slot is used to transmit data in a second transmission direction; and wherein the first configuration signaling has a higher priority than the second configuration signaling, transmitting, by the network device, data on the one or more symbols in the first transmission direction, and not transmitting data on the at least one of the one or more symbols in the second transmission direction;

wherein the first configuration signaling is cell-specific radio resource control (RRC) signaling.

10. The terminal according to claim 9, wherein the second configuration signaling is semi-static uplink (UL)/downlink (DL) configuration signaling, downlink control information (DCI) signaling, or user equipment (UE)-specific RRC signaling.

11. The terminal according to claim 10, wherein the one or more symbols in the slot are used to transmit data in a first transmission direction comprises that:

the one or more symbols in the slot, indicated by the cell-specific RRC signaling, are used to transmit data in uplink (UL) direction; and the at least one of the one or more symbols in the slot is used to transmit data in a second transmission direction comprises that:

the at least one of the one or more symbols in the slot, indicated by the DCI signaling, is used to transmit data in downlink (DL) direction.

12. The terminal according to claim 10, wherein the one or more symbols in the slot are used to transmit data in a first transmission direction comprises that:

the one or more symbols in the slot, indicated by the cell-specific RRC signaling, are used to transmit data in DL direction; and the at least one of the one or more symbols in the slot is used to transmit data in a second transmission direction comprises that:

the at least one of the one or more symbols in the slot, indicated by the DCI signaling, is used to transmit data in UL direction.

13. The terminal according to claim 10, wherein the one or more symbols in the slot are used to transmit data in a first transmission direction comprises that:
the one or more symbols in the slot, indicated by the cell-specific RRC signaling, are used to transmit data in UL direction; and
the at least one of the one or more symbols in the slot is used to transmit data in a second transmission direction comprises that:
the at least one of the one or more symbols in the slot, indicated by the UE-specific RRC signaling, is used to transmit data in DL direction.

14. The terminal according to claim 10, wherein the one or more symbols in the slot are used to transmit data in a first transmission direction comprises that:
the one or more symbols in the slot, indicated by the cell-specific RRC signaling, are used to transmit data in DL direction; and
the at least one of the one or more symbols in the slot is used to transmit data in a second transmission direction comprises that:
the at least one of the one or more symbols in the slot, indicated by the UE-specific RRC signaling, is used to transmit data in UL direction.

15. The terminal according to claim 9, wherein the transmitting data on the one or more symbols in the first transmission direction comprises:
transmitting data on the one or more symbols in UL direction.

16. The terminal according to claim 9, wherein the transmitting data on the one or more symbols in the first transmission direction comprises:
transmitting data on the one or more symbols in DL direction.

17. A non-transitory computer storage medium, storing a plurality of computer executable instructions thereon, wherein the computer executable instructions, when executed by a network device having a processor and a transceiver, cause the network device to implement a plurality of operations including:
sending, first configuration signaling to a terminal, wherein the first configuration signaling implicitly indicates that one or more symbols in a slot are used to transmit data in a first transmission direction;
sending, second configuration signaling to the terminal, wherein the second configuration signaling explicitly or implicitly indicates that at least one of the one or more symbols in the slot is used to transmit data in a second transmission direction; and
wherein the first configuration signaling has a higher priority than the second configuration signaling, transmitting, by the network device, data on the one or more symbols in the first transmission direction, and not transmitting data on the at least one of the one or more symbols in the second transmission direction;
wherein the first configuration signaling is cell-specific radio resource control (RRC) signaling.

18. The non-transitory computer storage medium according to claim 17, wherein the second configuration signaling is semi-static uplink (UL)/downlink (DL) configuration signaling, dynamic scheduling signaling, or user equipment (UE)-specific RRC signaling.

19. The non-transitory computer storage medium according to claim 17, wherein transmitting data on the one or more symbols in the first transmission direction comprises:
transmitting data on the one or more symbols in UL direction.

20. The non-transitory computer storage medium according to claim 17, wherein transmitting data on the one or more symbols in the first transmission direction comprises: transmitting data on the one or more symbols in DL direction.

* * * * *